C. K. NAGY.
POWER TRANSMISSION.
APPLICATION FILED JAN. 8, 1921.

1,390,920.

Patented Sept. 13, 1921.
2 SHEETS—SHEET 1.

Charles K. Nagy,
INVENTOR

BY Victor J. Evans
ATTORNEY

WITNESS:

C. K. NAGY.
POWER TRANSMISSION.
APPLICATION FILED JAN. 8, 1921.

1,390,920.

Patented Sept. 13, 1921.
2 SHEETS—SHEET 2.

Charles K. Nagy.
INVENTOR
BY Victor J. Evans
ATTORNEY

WITNESS:

UNITED STATES PATENT OFFICE.

CHARLES K. NAGY, OF GAINESVILLE, NEW YORK.

POWER TRANSMISSION.

1,390,920.  Specification of Letters Patent.  Patented Sept. 13, 1921.

Application filed January 8, 1921. Serial No. 435,941.

*To all whom it may concern:*

Be it known that I, CHARLES K. NAGY, a citizen of the United States, residing at Gainesville, in the county of Wyoming and State of New York, have invented new and useful Improvements in Power Transmission, of which the following is a specification.

This invention relates to means for utilizing the power plant of a motorcycle to drive other machines, the principal object of the invention being to provide means for transmitting the rotary movement of the rear wheel of the motorcycle to the device or machine to be driven.

Another object of the invention is to provide a small supporting frame for the transmission means which may be easily and quickly connected with the motorcycle frame to hold the transmission means thereon in engagement with a gear on the rear wheel of the motorcycle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
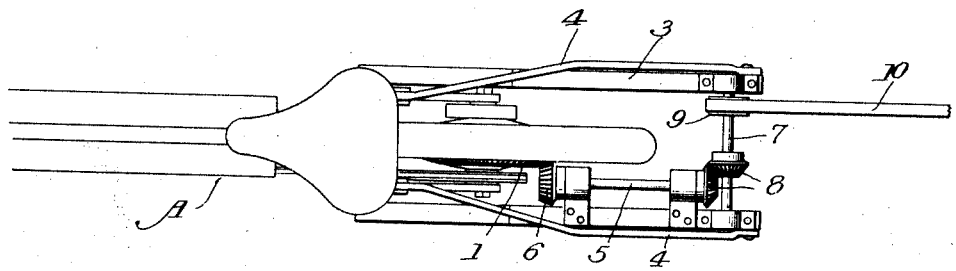
Figure 1 is a plan view showing the invention connected with the rear wheel of a motorcycle.
Figure 2:
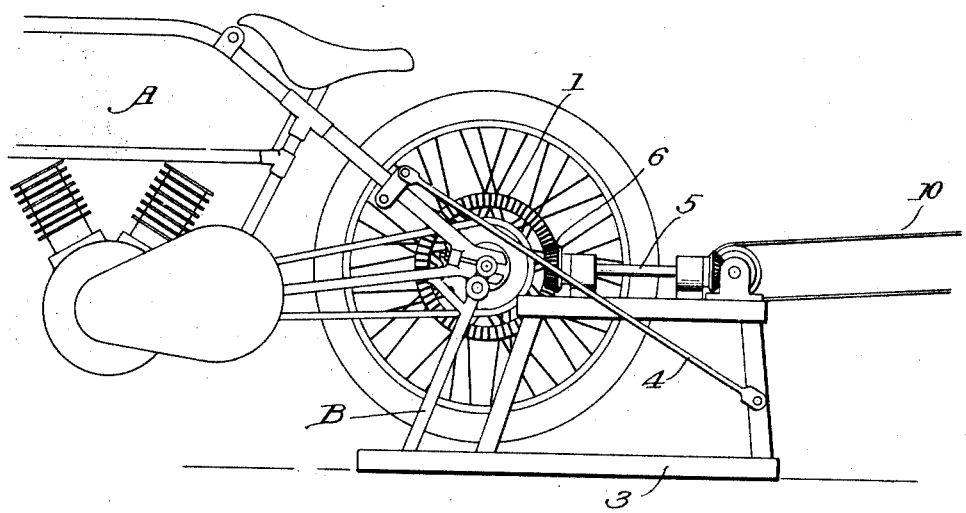
Fig. 2 is an elevation of Fig. 1.
Figure 3:
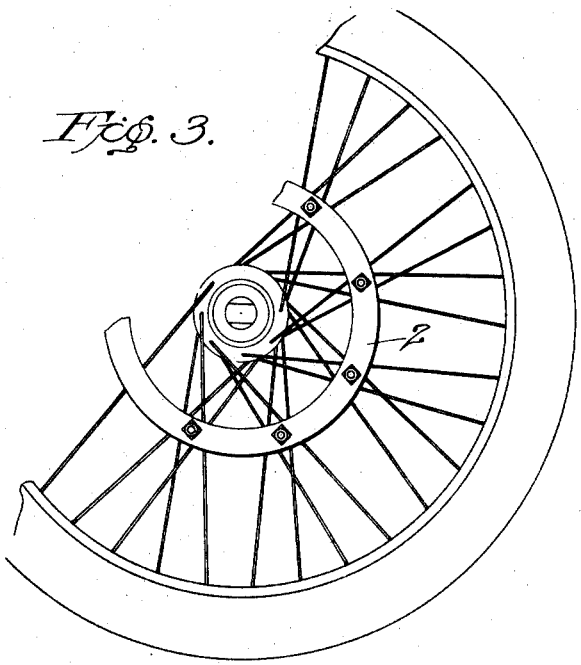
Fig. 3 is a fragmentary view showing how the ring gear is secured to the rear wheel of a motorcycle.
Figure 4:
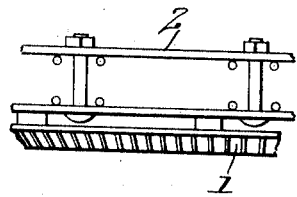
Fig. 4 is a fragmentary edge view of the ring and its attaching means.

In these views A indicates the motorcycle and B indicates the supporting frame for holding the rear wheel of the motorcycle off the ground. This frame is constructed as usual. In carrying out my invention I place a gear wheel 1 on the rear wheel of the motor and I prefer to connect this gear wheel to the spokes of the rear wheel by the grips 2. This gear is designed to be left on the wheel while the motorcycle is being used as it is so constructed that it will not be in the way. A supporting frame 3, preferably formed of wooden strips braced with iron rods, is provided for carrying the transmission means. This frame is of light weight so that it can be easily transported from place to place. It is adapted to be connected with the motorcycle frame by means of the braces 4 which have their upper ends provided with clamping means for engaging parts of the motorcycle frame. The frame 3 has journaled thereon a shaft 5, which at one end carries a small gear 6 which is adapted to mesh with the gear 1 on the motorcycle wheel when the frame is placed in the position shown in Fig. 1. A second shaft 7 is mounted on the frame and this shaft is geared to the first mentioned shaft by the gears 8. The shaft 7 is also provided with a pulley 9 which is adapted to receive a belt 10 which engages a pulley on the machine to be driven.

It will thus be seen that when the motorcycle is supported on its frame B with its rear wheel off the ground the frame 3 can be placed adjacent the rear wheel with the gears 1 and 6 in mesh. The frame 3 is then connected with the motorcycle frame by the braces 4. The belt is then connected with the machine to be driven and when the motor is started the rotation of the rear wheel of the motorcycle will be transmitted through the gears and shafts and the belt to the machine to be driven. I find that small machines of various kinds can be driven from the power plant of a motorcycle. For instance, it can be made to run water pumps, washing machines, cream separators, churns, grindstones and the like.

Due to the light weight of the supporting frame it can be easily carried from one place to another and can be carried into woodsheds, summer kitchens and so forth to operate machinery therein.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a motorcycle, a ring gear, clips for securing the same to the spokes of the rear wheel of the motorcycle, a supporting frame, means for detachably connecting the same with the motorcycle frame, a shaft journaled in said frame, a gear thereon meshing with the gear on the motorcycle wheel, a second shaft in the frame geared to the first mentioned shaft and a pulley connected with the second shaft.

In testimony whereof I affix my signature.

CHARLES K. NAGY.